US008610930B2

(12) United States Patent
Sumiuchi

(10) Patent No.: US 8,610,930 B2
(45) Date of Patent: Dec. 17, 2013

(54) INFORMATION PROCESSING APPARATUS, METHOD FOR CONTROLLING INFORMATION PROCESSING APPARATUS, AND STORAGE MEDIUM FOR DISPLAYING, ACQUIRING AND SPECIFYING A COVER STATE

(75) Inventor: Kazuyoshi Sumiuchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 269 days.

(21) Appl. No.: 12/905,865

(22) Filed: Oct. 15, 2010

(65) Prior Publication Data
US 2011/0116126 A1 May 19, 2011

(30) Foreign Application Priority Data
Nov. 16, 2009 (JP) ................................. 2009-260974

(51) Int. Cl.
G06F 15/00 (2006.01)
(52) U.S. Cl.
USPC ....................................................... 358/1.15
(58) Field of Classification Search
USPC ....................................................... 358/1.15
See application file for complete search history.

(56) References Cited

U.S. PATENT DOCUMENTS 6,734,985 B1* 5/2004 Ochiai .......................... 358/1.15
2007/0076253 A1* 4/2007 Shima .......................... 358/1.15
2008/0239385 A1* 10/2008 Suzuki et al. ................. 358/1.15

FOREIGN PATENT DOCUMENTS

JP 2001-092761 A 4/2001

OTHER PUBLICATIONS

Machine translation for JP 2001-092761, IDS.*

* cited by examiner

Primary Examiner — Qian Yang
(74) Attorney, Agent, or Firm — Canon USA Inc. IP Division

(57) ABSTRACT

An information processing apparatus which registers a printing apparatus connected to a network includes a printing apparatus detection unit configured to detect a printing apparatus connected to the network, a status information acquisition unit configured to acquire status information indicating a status of the detected printing apparatus, an operation content notification unit configured to notify a user of the information processing apparatus of an operation content to be performed on the printing apparatus to be registered, a printing apparatus specification unit configured to, after operations have been performed according to the operation content, determine whether the status of the printing apparatus has been changed based on the acquired status information, and specify a printing apparatus in which a status thereof is determined to be changed as the printing apparatus to be registered, and a printing apparatus registration unit configured to register the specified printing apparatus.

11 Claims, 10 Drawing Sheets

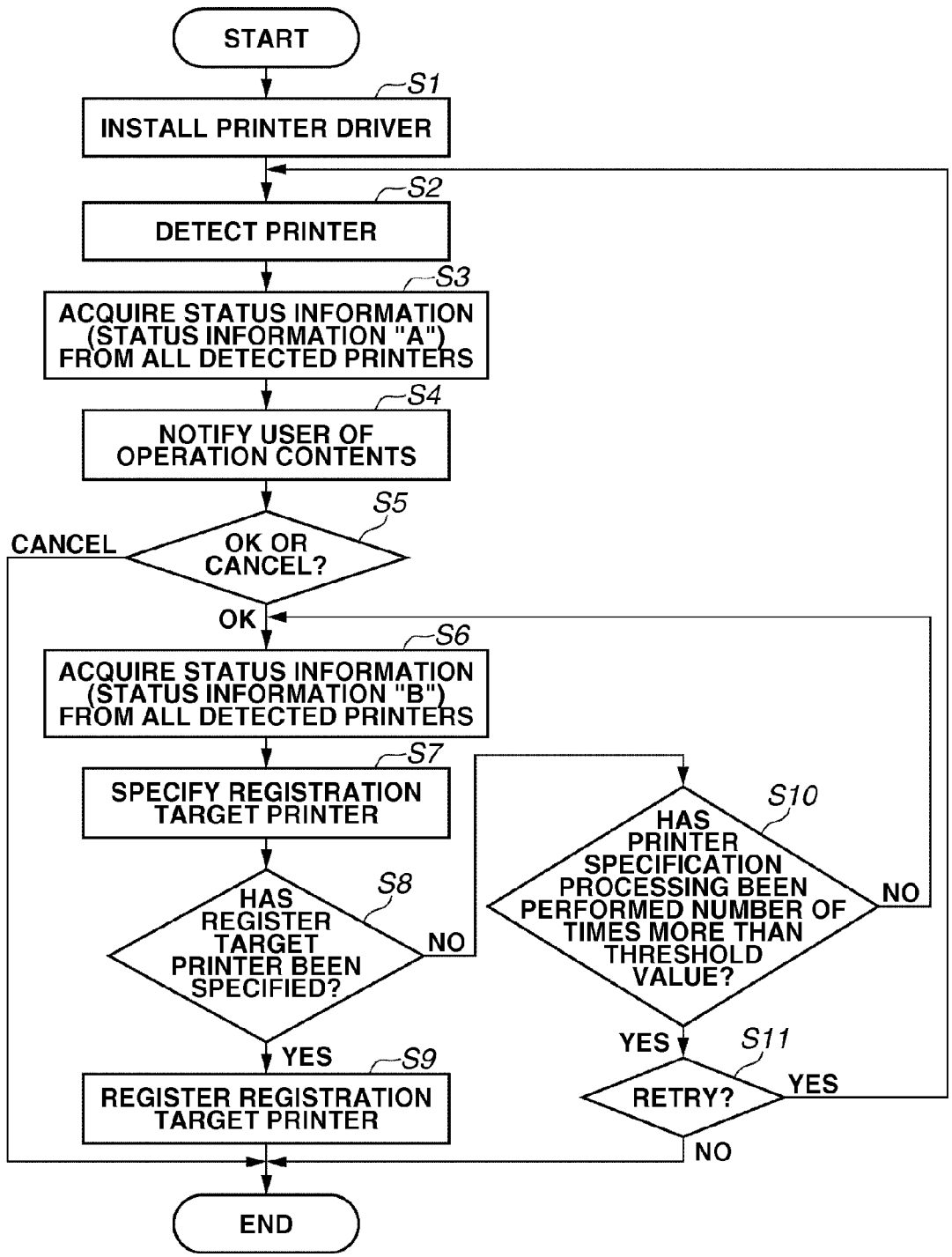

FIG.5A

| PRINTER STATUS | CODE NUMBER EXAMPLE | COMMAND EXAMPLE | TEXT EXAMPLE |
|---|---|---|---|
| OPERATION STATUS: WAITING | 0x0400 | BS: ID | Base Status: Idle |
| CYAN (C) INK REMAINING AMOUNT 30% | 0x011E | INC: 30 | Ink C: 30 |
| MAGENTA (M) INK REMAINING AMOUNT 100% | 0x0264 | INM: 100 | Ink M: 100 |
| YELLOW (Y) INK REMAINING AMOUNT 100% | 0x0364 | INY: 100 | Ink Y: 100 |
| BLACK (BK) INK REMAINING AMOUNT 70% | 0x0446 | INBk: 70 | Ink Bk: 70 |
| COVER: OPEN | 0x8001 | CV: OP | Cover: Open |
| PAPER OUT ERROR: NONE | 0x8010 | EEMP: N | Paper Empty Error: None |
| PAPER JAM ERROR: NONE | 0x8020 | EJAM: N | Paper Jam Error: None |
| .... | .... | .... | .... |

PRINTER IS REGISTERED.
OPEN COVER OF PRINTER TO BE REGISTERED.

OK    CANCEL

| REGISTRATION NAME | PRINTER DRIVER | I/F | OUTPUT DESTINATION |
|---|---|---|---|
| Photo Printer A | Photo A Driver Ver. 1.20 | LAN | 00.00.85.ea.df.41 |
| Photo Printer B | Photo B Driver Ver. 3.00 | USB | dev/usb/lp0 |
| Monochro Printer | Mono Type A Ver. 1.00 | LAN | 00.00.82.13.a2.e1 |

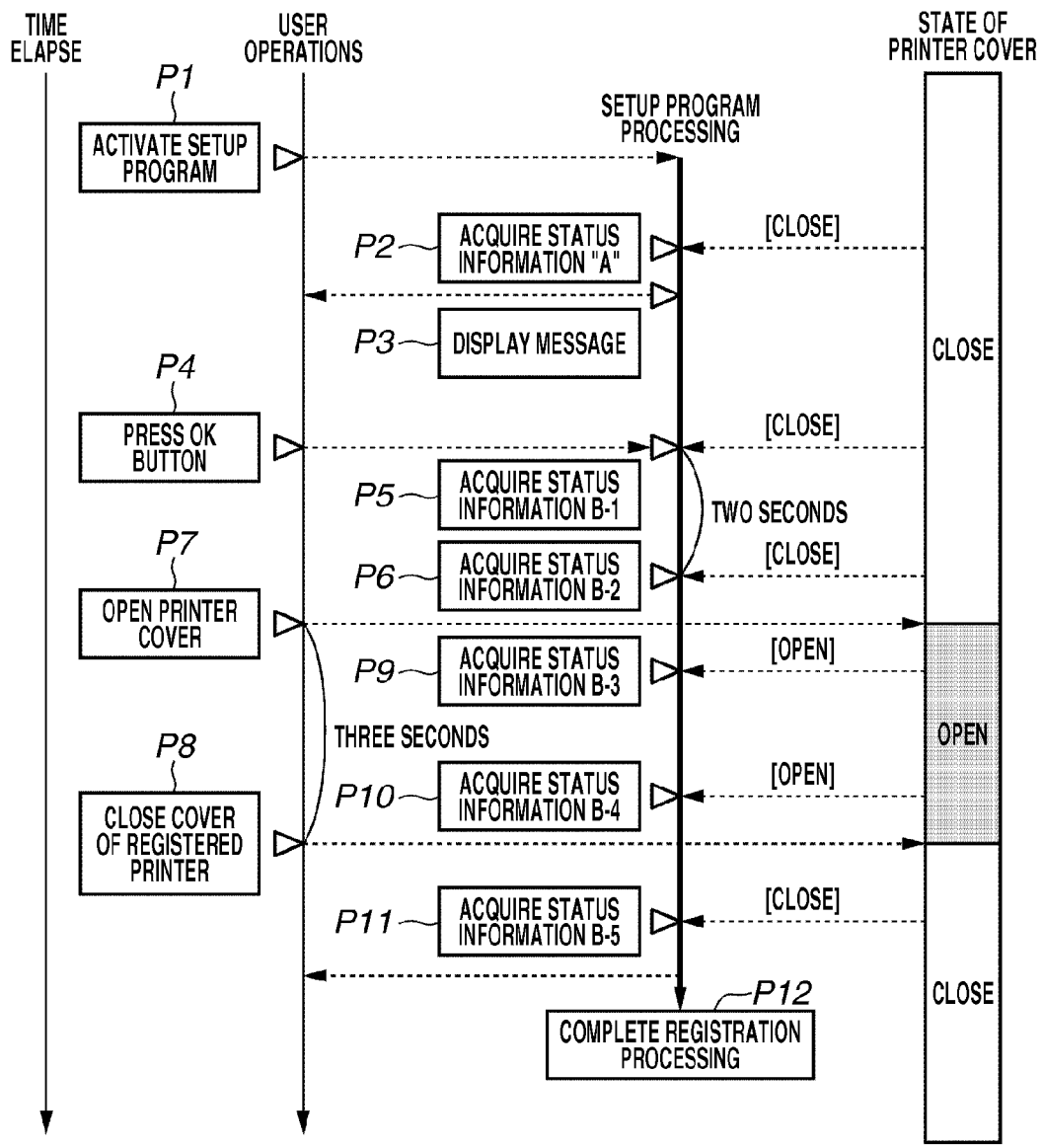

INFORMATION PROCESSING APPARATUS, METHOD FOR CONTROLLING INFORMATION PROCESSING APPARATUS, AND STORAGE MEDIUM FOR DISPLAYING, ACQUIRING AND SPECIFYING A COVER STATE

BACKGROUND OF THE INVENTION

1. Field of the Invention

The present invention generally relates to information processing and, more particularly, to an information processing apparatus, a method for controlling the information processing apparatus, and a storage medium.

2. Description of the Related Art

A printing system has been discussed in which a plurality of host devices, such as personal computers, and a plurality of output devices, such as printers, are connected with each other via a local area network (LAN) in an office. In such a printing system, when the host device instructs the output device to perform printing, generally, after installation and initial setup are completed at the output device side, the host device registers the output device to be used and selects the registered device to perform printing. The initial setup for installing the output device includes filling of toner and ink, color calibration, and printer setup for connecting to the network. When an inkjet printer is used as the output device, for example, the initial setup includes an operation for correcting a head.

When the host device registers a printer serving as the output device, generally, the host device installs a printer driver and registers the printer to be used to associate with the printer driver using a setup program. The above-described printer driver is software for using the printer to be registered. In the registration of the printer, if the host device detects a plurality of printers in the network, a user of the host device needs to specify and select a printer the user wants to use from a list of the printers.

When a plurality of printers is detected in the network, as a method for specifying a target printer to be registered, a following method is discussed. More specifically, a setup program displays a list of pieces of address information about media access control (MAC) addresses and internet protocol (IP) addresses of the detected printers. A user can select the address information about the target printer to be registered from among the displayed pieces of the address information to specify the target printer.

The Japanese Patent Application Laid-Open No. 2001-92761 discusses a network system to specify a printer to be operated as described below. More specifically, a user previously presses a mark button provided at the printer to operate. When a computer detects the printer in the network, the computer acquires information including a status of pressing the mark button, mark identification (ID), a user name, and so on, and represents them to the user. Based on the represented information, the user specifies the printer to operate.

However, the method in which the user selects the address information about the target printer to be registered from among the address information displayed by the setup program to specify the target printer may cause a problem as described below. The user needs to check the address information to select the address information about the target printer to be registered. More specifically, a display device such as a liquid crystal panel included in a printer body displays the address information, and then the user needs to perform troublesome tasks such as checking or printing the displayed address information. Further, some methods in which the user selects the printer to be registered based on a list of numerical values and alphabets included in the MAC addresses and the IP addresses of the printers can easily cause a human error.

According to a technique discussed in the Japanese Patent Application Laid-Open No. 2001-92761, a user needs not only to press the mark button but also to perform a specific operation, for example, for setting the mark identification ID or the user name. Therefore, according to the technique discussed in the Japanese Patent Application Laid-Open No. 2001-92761, the user cannot specify and register the target printer with easy operations. In recent years, inkjet printers that are low cost and can be connected to the network have been discussed, and various types of users have been using the printers in the network. Thus, it is necessary to specify the printer in the network and register it to the system with easier operations.

SUMMARY OF THE INVENTION

The present invention is directed to an information processing apparatus, a method for controlling the information processing apparatus, and a computer program that enables a user to specify and register a printer in the network with easy operations.

According to an aspect of the present invention, an information processing apparatus which registers a printing apparatus connected to a network includes a printing apparatus detection unit configured to detect a printing apparatus connected to the network, a status information acquisition unit configured to acquire status information indicating a status of the detected printing apparatus, an operation content notification unit configured to notify a user of the information processing apparatus of an operation content to be performed on the printing apparatus to be registered, a printing apparatus specification unit configured to, after operations have been performed according to the operation content, determine whether the status of the printing apparatus has been changed based on the acquired status information, and specify a printing apparatus in which a status thereof is determined to be changed as the printing apparatus to be registered, and a printing apparatus registration unit configured to register the specified printing apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a flowchart illustrating operation processing performed by the computer according to a first exemplary embodiment.

FIGS. 5A, 5B, and 5C are examples of status information, a display screen for an operation, and information about registered printers according to an exemplary embodiment of the present invention.

FIGS. 6A and 6B illustrate transition of user operations and printer statuses according to an exemplary embodiment of the present invention.

DESCRIPTION OF THE EMBODIMENTS

Various exemplary embodiments, features, and aspects of the invention will be described in detail below with reference to the drawings.

Figure 1:
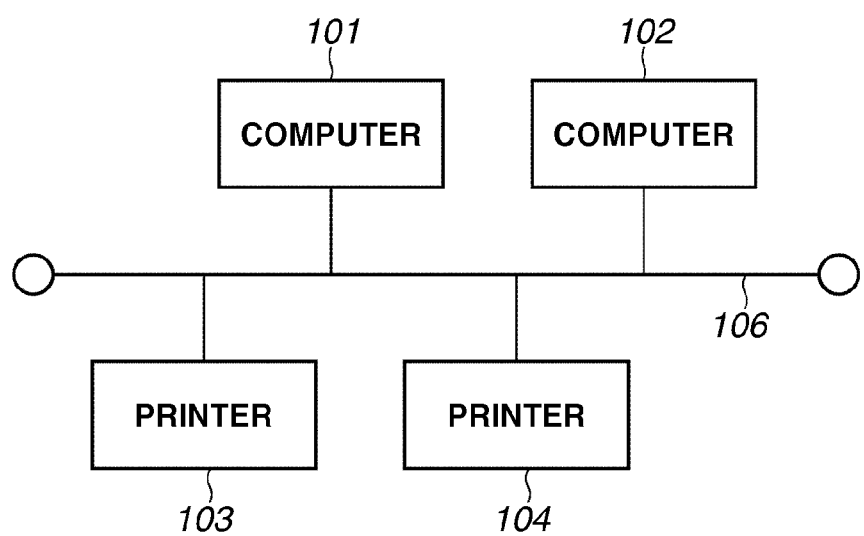
FIG. 1 illustrates an example of a system configuration according to an exemplary embodiment of the present invention.

FIG. 1 illustrates an example of a system configuration of an exemplary embodiment according to the present invention. The system illustrated in FIG. 1 includes a plurality of computers 101 and 102, and a plurality of printers 103 and 104. The computers 101 and 102 and the printers 103 and 104 are connected to a network 106, and can communicate with each other according to, for example, a transmission control protocol/Internet protocol (TCP/IP) protocol. The computers 101 and 102 have similar functions. Further, the printers 103 and 104 have similar functions.

Figure 2:
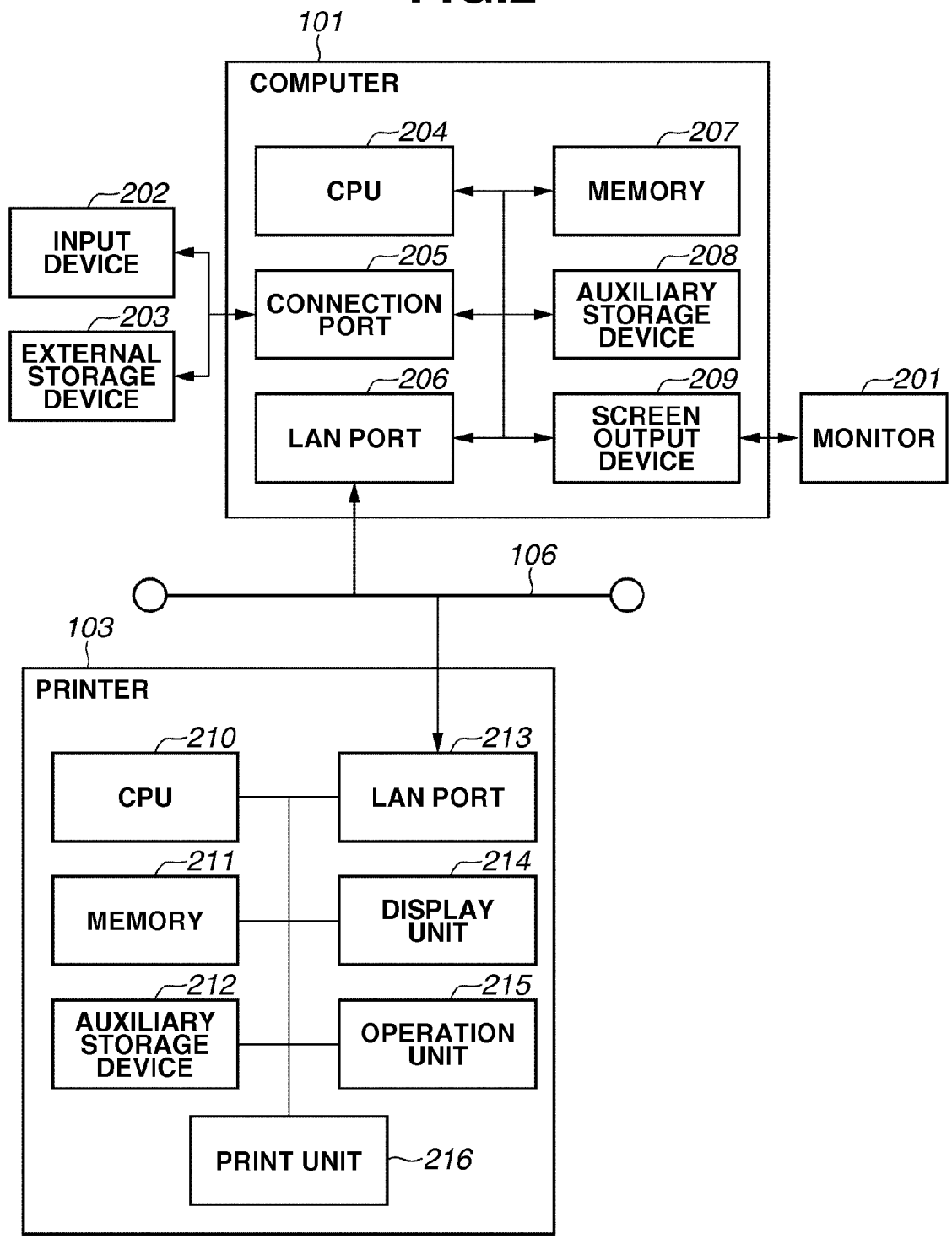
FIG. 2 illustrates an example of configurations of a computer and a printer according to an exemplary embodiment of the present invention.

FIG. 2 illustrates an example of configurations of the computer 101 and the printer 103. The computer 101 is an information processing apparatus according to the present exemplary embodiment. As a unique operation of the present exemplary embodiment, the computer 101 registers the printer 103 that is a printing apparatus connected therewith via the network 106. Further, the computer 101 functions as a print control apparatus that instructs the printer 103 to print print data. A computer described in each of first, second, third and fourth exemplary embodiments has a configuration similar to that of the computer 101 illustrated in FIG. 2.

The computer 101 includes a central processing unit (CPU) 204, a connection port 205, a local area network (LAN) port 206, a memory 207, an auxiliary storage device 208, and a screen output device 209. The CPU 204 controls the entire computer 101. As a unique operation of the present exemplary embodiment, the CPU 204 displays an operation content to be performed on the printer to be registered on the monitor 201 via the screen output device 209. With this arrangement, the operation content to be performed on the printer to be registered is notified to the user.

The CPU 204 transmits a status request to the printer 103 via the LAN port 206 and the network 106. The status request is control information for requiring transmission of the status information indicating a status of the printer 103. The status information includes an operation status of the printer 103, which is, for example, during printing or during a waiting state, and a state of an error occurring in the printer 103, such as paper out, and opening of a cover. The CPU 204 receives the status information from the printer 103 according to the status request, and determines whether the printer 103 is the printer to be registered based on the status of the printer 103 indicated by the received status information. Further, the CPU 204 transmits a print command to the printer 103 via the LAN port 206 and the network 106.

The connection port 205 connects peripheral devices such as the input device 202 and the external storage device 203 to the computer 101. The connection port 205 includes, for example, a serial port and a universal serial bus (USB). The LAN port 206 connects the computer 101 to the network 106. The memory 207 includes a random access memory in which the CPU 204 expands an operation region. The auxiliary storage device 208 includes, for example, a hard disk or a solid state drive (SSD). The auxiliary storage device 208 stores various types of programs such as a printer driver 302, a setup program 303, and an application 301 illustrated in FIG. 3. The screen output device 209 includes, for example, a video card. The screen output device 209 outputs various types of information onto the screen. The input device 202 includes, for example, a keyboard, a mouse, and a scanner, and inputs various types of information according to the user's operations. The external storage device 203 includes, for example, a USB memory, an external hard disk, a compact disk read only memory (CD-ROM), and a digital versatile disk-ROM (DVD-ROM). The monitor 201 is connected to an output terminal of the screen output device 209.

The printer 103 includes a CPU 210, a memory 211, an auxiliary storage device 212, a LAN port 213, a display unit 214, an operation unit 215, and a printing unit 216. The CPU 210 controls the entire printer 103. As a unique operation of the present exemplary embodiment, the CPU 210 receives the status request from the computer 101 via the network 106 and the LAN port 213. Further, according to the received status request, the CPU 210 transmits to the computer 101 the status information indicating the status of the printer 103. The CPU 210 receives the print command from the computer 101 via the network 106 and the LAN port 213, and instructs the printing unit 216 to print the print data corresponding to the print command.

The memory 211 is a random access memory in which the CPU 210 expands an operation region. The auxiliary storage device 212 includes a hard disk or an SSD. The LAN port 213 connects the printer 103 to the network 106. The display unit 214 displays a user interface (UI) dealing with the user's operations via the operation unit 215 and the operation status of the printer 103. The operation unit 215 operates a main body of the printer 103 according to the operation input by the user. The operation unit 215 includes functions for turning on and off power supply of the printer 103, canceling a job, changing network setup of the printer 103, referring to the network setup, and the like. The printing unit 216 prints the print data according to the instruction given by the CPU 210.

Figure 3:
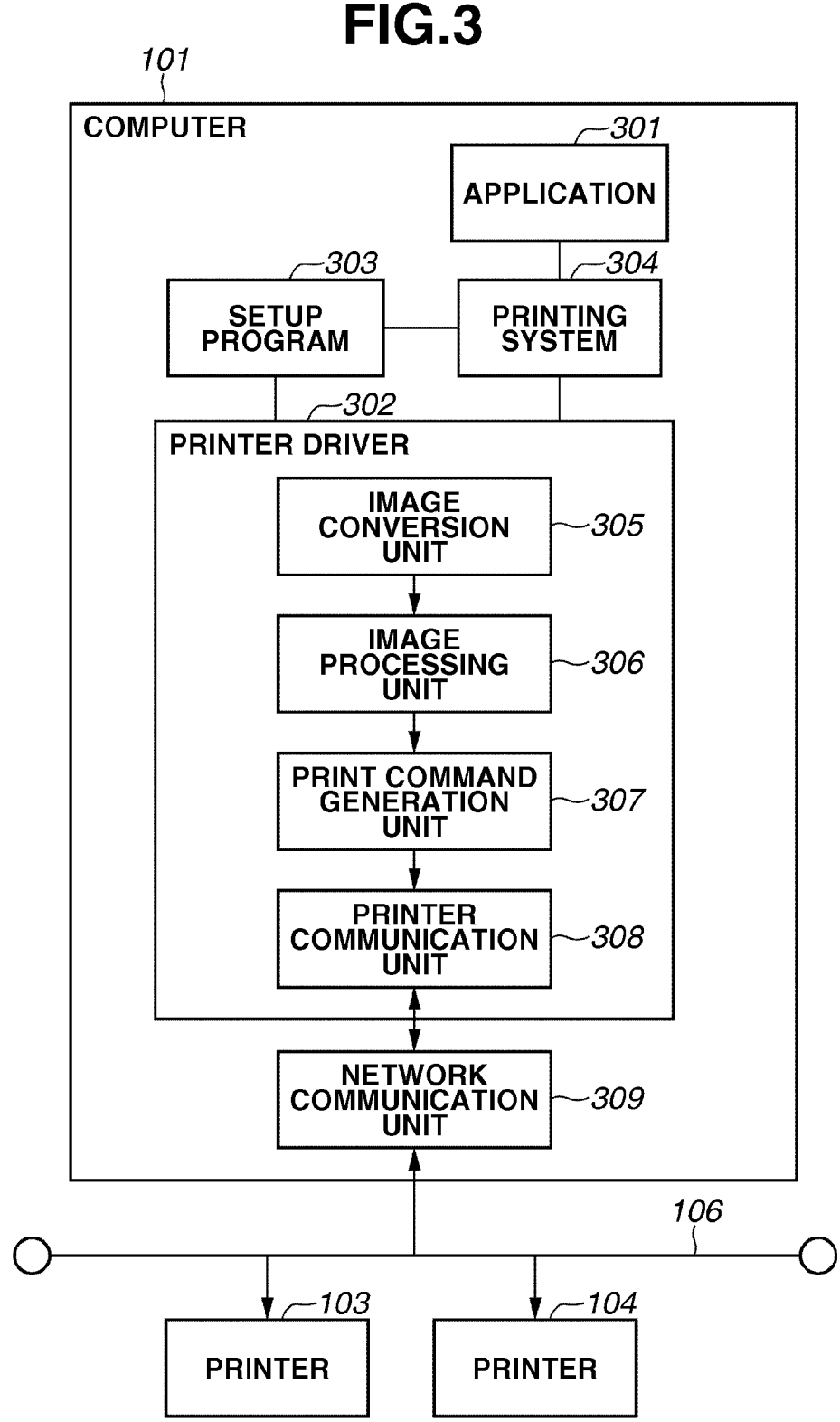
FIG. 3 is a block diagram illustrating an example of a functional configuration in the computer according to an exemplary embodiment of the present invention.

FIG. 3 is a block diagram illustrating an example of a functional configuration in the computer illustrated in FIGS. 1 and 2. The computer 101 includes an application 301, a printer driver 302, a setup program 303, a printing system 304, and a network communication unit 309 which are stored in the auxiliary storage device 208 illustrated in FIG. 2, expanded in the memory 207, and executed by the CPU 204. The application 301 displays a UI for print setting on the screen and performs the print setting according to the operation input by the user via the UI.

The printer driver 302 converts the print data into a format according to the print setting set by the application 301, and then generates a print command corresponding to the print data. The printer driver 302 transmits the print command to the printer via the network communication unit 309 and the network 106. As a unique operation of the present exemplary embodiment, the printer driver 302 transmits the status request to the printer in the network 106 detected by the setup program 303. Further, the printer driver 302 receives the status information from the printer responding to the status request and transmits the status information to the setup program 303.

As illustrated in FIG. 3, the printer driver 302 includes an image conversion unit 305, an image processing unit 306, a print command generation unit 307, and a printer communication unit 308. The image conversion unit 305 converts the print data including red, green, and black (RGB) components, which is an image data format, into cyan, magenta, yellow, and black (CMYK) components that are appropriate for printing. The image processing unit 306 performs image processing, such as error diffusion, on the print data converted by the image conversion unit 305 according to the print setting. The print command generation unit 307 generates a print command corresponding to the print data. The printer communication unit 308 transmits the print command to the printer via the network communication unit 309 and the network 106. Further, the printer communication unit 308 transmits the status request to the printer detected by the setup program 303 via the network communication unit 309 and the network 106 according to the instruction from the setup program 303. Furthermore, the printer communication unit 308 receives the status information from the printer responding to the status request and transmits the status information to the setup program 303.

The setup program 303 installs the printer driver 302 and registers the printer according to the instruction from the CPU 204. More specifically, the setup program 303 functions as a printing apparatus detection unit that detects the printers (printers 103 and 104 in FIG. 3) connected to the network 106. Further, the setup program 303 functions as a status information acquisition unit that acquires the status information indicating the status of the detected printer. More specifically, the setup program 303 instructs the printer communication unit 308 in the printer driver 302 to transmit the status request to the detected printer as described above. Then, the setup program 303 receives the status information from the printer communication unit 308 that has received the status information from the printer which was a transmission destination of the status request.

Furthermore, the setup program 303 functions as an operation content notification unit that notifies the user of the computer 101 of the operation content to be performed on the printer to be registered. More specifically, the setup program 303 displays the operation content to be performed on the printer to be registered on the monitor 201 according to the instruction given by the CPU 204. The setup program 303 also functions as a printing apparatus specification unit. In other words, the setup program 303 determines whether the printer status changes based on the acquired status information described above. The setup program 303 specifies the printer whose status is determined to be changed as the printer to be registered. For example, the setup program 303 compares the status indicated by the status information acquired before the operation content is notified with the status indicated by the status information acquired after the operation content is notified. Based on the comparison result, the setup program 303 determines whether the printer status has changed.

The printing system 304 manages a printer list. The printer list refers to a list of the printers to be used for printing. When a user actually performs printing, the application 301 displays the printers registered in the printer list on the UI. Via the display, the user can select the printer that the user would like to use for printing from among the registered printers. The printing system 304 functions as a printing apparatus registration unit for registering the printer specified as a registration target by the setup program 303 in the printer list.

The printing system 304 is a part of an operating system (OS) used by the computer 101. For example, when Linux® is used as the OS, the common unix printing system (CUPS)® is used as the printing system 304. The network communication unit 309 communicates with the printers 103 and 104 via the network 106. The method for controlling the information processing apparatus of the present exemplary embodiment and its computer program can be realized by the functions of the configuration units included in the computer 101 illustrated in FIG. 3.

FIG. 4 is a flowchart illustrating operation processing performed by the computer according to a first exemplary embodiment according to the present invention. The processing in steps S1 to S11 illustrated FIG. 4 can be realized when the CPU 204 executes the setup program 303 and the printing system 304. When the operation processing illustrated in FIG. 4 is started, a cover of the printer connected to the computer 101 via the network 106 is in a closed state. The closed state refers to a state in which the cover is closed.

First, according to an operation input by a user, the setup program 303 is activated. In step S1, the setup program 303 copies, or installs, programs including the printer driver 302 into a predetermined storage unit in the computer 101. In step S1, the setup program 303 requests the OS to install the printer driver 302.

Next, in step S2, the setup program 303 detects the printer connected to the network 106. In step S2, the setup program 303 acquires a type name representing a type of the printer and information corresponding to the MAC address and the IP address of the printer. In step S3, the setup program 303 acquires the status information about each of all detected printers. The setup program 303 stores the status information acquired in step S2 in a predetermined buffer as the "status information A".

Figures 5B, 5C:
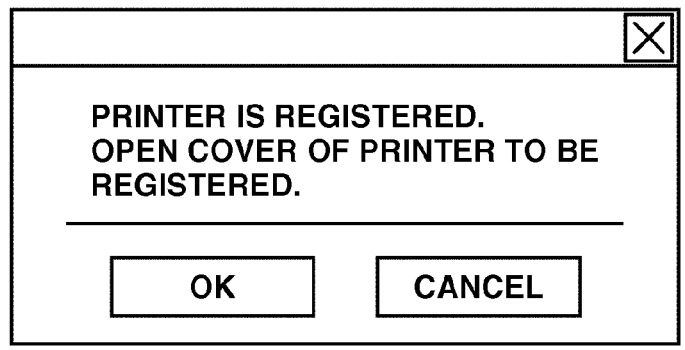

FIGS. 5A, 5B, and 5C illustrate examples of the status information, a display screen for the operation content, and registered printer information. FIG. 5A illustrates an example of the status information. The status information includes information indicating a printer status, such as a printer operation status, an ink remaining amount in the printer, a cover state, errors, and the like. The cover state refers to whether the cover is in an open state or in the closed state. The open state refers to that the cover is open. The status information can be an arbitrary format according to the type of the printer or a manufacturer thereof. The example illustrated in FIG. 5A includes a code number, a command row, and text data corresponding to the printer status.

Back to FIG. 4, in step S4, the setup program 303 notifies the user of the operation content to be performed on the printer of the registration target. In step S4, the setup program 303 displays on the monitor 201 a message instructing the user to open (set to the open state) the cover of the printer to be registered. The setup program 303 displays the above-described message using the graphical user interface (GUI). The setup program 303 may display the message using the character-based user interface (CUI) using terminal software.

FIG. 5B illustrates an example of the display screen of the operation content notified to the user. The example illustrated in FIG. 5B displays the message instructing the user to open the cover of the printer to be registered. When the user checks the operation content displayed on the display screen illustrated in FIG. 5B to open the printer cover, the user presses an OK button and then opens the cover.

Back to FIG. 4, in step S5, the setup program 303 determines whether the operation content notified in step S4 is performed (OK) or not (CANCEL). More specifically, when the user presses the OK button on the display screen illustrated in FIG. 5B, the setup program 303 determines that the operation is performed. When the user presses a CANCEL button on the display screen illustrated in FIG. 5B, the setup program 303 determines that the operation is not performed.

When the setup program 303 determines that the operation is not performed (NO in step S5), the processing is terminated. When the setup program 303 determines that the operation is performed (YES in step S5), then in step S6, the setup program 303 acquires the status information again from all printers detected in step S2. The setup program 303 stores the status information acquired in step S6 in a predetermined buffer as the "status information B".

Next, in step S7, the setup program 303 specifies the printer to be registered. More specifically, the setup program 303 determines whether the status indicated by the status information B stored in the step S6 has changed from the status indicated by the status information A of the printer stored in step S3. The setup program 303 specifies the printer whose status has been changed as the printer to be registered.

According to this example, the setup program 303 notifies the user to open the cover of the printer to be registered. Thus, when the cover state included in the status information A is the closed state and the cover state included in the status information B is the open state, the setup program 303 specifies the printer from which the status information A or B is acquired as the printer to be registered.

Next, in step S8, the setup program 303 determines whether the printer to be registered is specified. When setup program 303 determines that the target printer to be registered is specified (YES in step S8), in step S9, the printing system 304 registers the target printer.

The processing for registering the printer performed in step S9 described above will be described in more detail. The setup program 303 transmits a registration name of the printer specified in step S8, a printer driver name to be used for printing, and corresponding information about the MAC address of the printer as registered printer information to the printing system 304. The setup program 303 instructs the printing system 304 to register the transmitted registered printer information. According to the instruction from the setup program 303, the printing system 304 registers the information including the registered printer information to the printer list.

FIG. 5C is an example of the registered printer information to be registered in the printer list. A "registration name" refers to the registration name of the printer. A "printer driver" refers to the printer driver name to be used for printing. An interface "I/F" is used between the printer and the printer driver. An output destination refers to the MAC address or the USB port number of the printer.

According to an example illustrated in FIG. 5C, three printers are registered by the registration names of "Photo Printer A", "Photo Printer B", and "Monochro Printer". For example, the "Photo Printer A" uses the printer driver "Photo A Driver Ver.1.20" and the LAN for the interface, and the MAC address of the output destination is "00.00. 85. ea. df. 41". Further, the "Photo Printer "B"" uses the USB for the interface. Thus, the USB port number is registered as the output destination.

The registered printer information is not limited to the information illustrated in FIG. 5C. According to the types of the OS of the computer 101 and the printing system 304, arbitrary information for specifying the printer can be registered as the registered printer information.

Back to FIG. 4, when the setup program 303 determines that the printer to be registered is not specified (NO in step S8), in step S10, the setup program 303 determines whether printer specification processing has been performed the number of times more than a threshold value. When the setup program 303 determines that the printer specification processing has not been performed the number of times more than threshold value (NO in step S10), the processing returns to step S6.

The processing returns to step S6, and then the setup program 303 acquires the status information again. Accordingly, when the printer to be registered is not specified, the printer specification processing is repeated to the predetermined number of times. Considering a case where the printer to be registered is located away from the computer 101, the setup program 303 repeats the processing for acquiring the status information at a predetermined time interval (for example, at a two-second interval).

When the setup program 303 determines that the printer specification processing has been performed the number of times more than the threshold value (YES in step S10), in step S11, the setup program 303 determines whether to retry the processing from step S2 and subsequent steps. For example, by determining whether the number of times of retrials exceeds the predetermined number of times, the setup program 303 determines whether to retry the processing from step S2 and subsequent steps.

The setup program 303 may display a message for inquiring whether to retry, and then may determine whether to retry according to an instruction input by the user who checks the message. When the setup program 303 determines to retry the processing from step S2 and subsequent steps, the processing returns to step S2. When the setup program 303 determines not to retry the processing from step S2 and subsequent steps, the processing ends.

Next, the processing for causing the printer 103 to perform printing after the computer 101 registers the target printer to be registered (for example, the printer 103) will be described. First, the application 301 displays a menu so that the user can select the printer to be used for printing. The application 301 inquires a list of registration names of the printers that are currently registered on the printer list from the printing system 304 and acquires the list. The application 301, then, displays the list of the acquired printer registration names on the menu.

When the user selects a desired printer registration name from among the list of the printer registration names, the application 301 displays the UI for setting printing. The print setting includes setting of, for example, a paper type, such as plain paper/photo paper, a paper size, such as A4/letter, two-sided printing, and a layout. The application 301 determines the print setting to be set as bellow. The application 301 acquires a list of items that can be set by the printer driver 302 corresponding to the printer registration name selected by user and values that can be set for respective items from the printer driver 302 via the printing system 304. The application 301, then, determines the print setting to be set based on the acquired items and the settable values thereof.

When the user presses a print execution button after setting printing via the UI, the print processing is started. A flow of the print processing is described as bellow. The application 301 converts the print data into a predetermined format that does not depend on an output device (for example, portable document format (PDF) or Post Script®) and outputs the print data. The application 301 inputs the output print data to the printing system 304 and requests the printing system 304 to perform print processing. At this point, by notifying the printing system 304 of the printer registration name selected by the user, the application 301 requests the printing system 304 to cause the printer corresponding to the registration name to perform printing.

The printing system 304 receives the request from the application 301, and then searches for the printer driver 302 corresponding to the printer registration name. The printing system 304 converts the print data into the format which the printer driver 302 acquired by the search can receive, outputs the print data, and then transmits the output print data to the printer driver 302. At this point, the printing system 304 notifies the printer driver 302 of information about various items of the print setting according to the user operation input via the UI for print setting.

The printer driver 302 converts the data transmitted from the printing system 304 into the print command according to the print setting using the image conversion unit 305, the image processing unit 306, and the print command generation unit 307. The printer driver 302 outputs the print command to the printing system 304. The printing system 304 transmits the print command output by the printer driver 302 to the MAC address which is the output destination corresponding to the printer registration name selected by the user, in other words the printer 103. The printer 103 forms the print data corresponding to the print command on the paper, and then the print processing ends.

In the computer 101 of the first exemplary embodiment, the setup program 303 instructs the user about the operation content and the printer to be registered is specified based on changes of the state indicated by the status information about the printer that changes according to the operations performed by the user. Therefore, the computer 101 can specify the printer to be registered based on a simple operation performed by a user (for example, only opening and closing of the cover of the printer to be registered). Further, according to the computer 101 of the present exemplary embodiment, the user does not need to check the MAC address and the IP address of the printer to specify the printer to be registered. Accordingly, a human error, for example, the user selects a wrong printer in registration of the printer, can be prevented from occurring.

In the recent years, some inexpensive inkjet printers do not include a display device such as a liquid crystal panel in the printer body. Or, as with printers including a seven-segment display, the display device of the printer has low functions. Conventionally, it has been difficult to register such type of printer by manually checking the MAC address thereof since the display device thereof has the low functions.

By applying the computer 101 of the present exemplary embodiment, there is no need to register the printer by manually checking the MAC address of the printer. Thus, the printer whose display device has the low functions can be easily registered. Further, since the computer 101 of the present exemplary embodiment specifies the printer to be registered based on the changes of the status of the printer, it is not necessary to provide a mark button or its alternative button on an operation panel of the printer.

According to the present exemplary embodiment, the operation content which the setup program 303 instructs to the user to specify the printer is the operations of the printer cover. However, as long as an operation involving a change of the state indicated by the status information of the printer, the operation is not limited to that of the cover.

Next, a second exemplary embodiment will be described. According to the computer 101 of the above described first exemplary embodiment, in step S8 illustrated in FIG. 4, when the cover state included in the status information of the printer changes from the closed state to the open state, the setup program 303 specifies this printer as the target printer to be registered. However, for example, after the user has executed the setup program 303 to start the printer registration processing, another user may open a cover of another printer in the network 106 to exchange the ink. In this case, the other printer is erroneously determined as the printer to be registered. Therefore, according to the second exemplary embodiment, the setup program 303 stores a plurality of statuses acquired in step S6 illustrated in FIG. 4, and specifies the target printer to be registered based on transition of the change indicated by the plurality of the statuses.

With reference to FIG. 4, operation processing performed by the computer 101 of the second exemplary embodiment will be described. The similar processing to that of the first exemplary embodiment will not be repeatedly described. According to the second exemplary embodiment, in step S4 illustrated in FIG. 4, the setup program 303 displays a message for notifying a user of a first operation content to be performed on the printer and a second operation content to be performed when a predetermined time has elapsed after the first operation has been executed. For example, the setup program 303 displays a message of "Printer will be registered. Please open the cover of the printer to be registered, and then close the cover after three seconds have elapsed." On the display screen with this message, an OK button and a CANCEL button are provided similarly to the display screen illustrated in FIG. 5B.

The setup program 303 set an opening and closing interval of the cover that is instructed to the user in the above-described message to a time interval at which both of the closed state and the open state following the closed state of the cover can be acquired according to a time interval for repeatedly acquiring the status information B. The opening and closing interval of the cover refers to a time interval from the printer cover is opened until it is closed.

According to this example, the interval for acquiring the status information when the processing in steps S6 to S8 is repeatedly performed for a predetermined number of times is two seconds. Thus, the setup program 303 sets the interval for opening and closing the printer cover that is notified to the user by the massage to three seconds which is longer than the time interval for acquiring the status information. If the printer to be registered can be specified based on the transition of the change of the sate indicated by the status information, the setup program 303 may set the interval for opening and closing the cover and the time interval for acquiring the status information to arbitrary values.

In the second exemplary embodiment, the interval for acquiring the status information is set to two seconds, and the interval for opening and closing the printer cover that is instructed to the user is set to three seconds. Thus, in the printer specification processing performed in step S7 illustrated in FIG. 4, the setup program 303 defines a condition described bellow as a condition (printer registration condition) for specifying a printer as the printer to be registered. More specifically, when the cover state indicated by the acquired status information B changes to the closed state after the open state has been indicated once, or twice continuously, the setup program 303 defines the printer from which the status information B is acquired as the printer to be registered.

FIGS. 6A and 6B illustrate user operations and the transition of the status of the printer according to the second exemplary embodiment. FIG. 6A illustrates the user operations and the status information which are repeatedly acquired. FIG. 6B illustrates the cover status of the printer indicated by the acquired status information. Status information B-1, B-2, B-3, B-4, and B-5 illustrated in FIGS. 6A and 6B refer to the status information B repeatedly acquired at the two-second time interval.

First, the user activates the setup program 303 (refer to processing P1 illustrated in FIG. 6A). The processing in steps S1, S2, and S3 illustrated in FIG. 4 is performed to acquire the status information A (refer to processing P2 illustrated in FIG. 6A). At this point, since the cover status of the printer which the user wants to register is the closed state, the state indicated by the status information A is also the closed state (refer to FIG. 6B). Next, the setup program 303 displays on the screen a message for notifying the user of the above-described operation content for opening and closing the printer cover (refer to processing P3 illustrated in FIG. 6A).

When the user presses the OK button on the message display screen (refer to processing P4 illustrated in FIG. 6A), the processing proceeds to step S6 illustrated in FIG. 4. The setup program 303 acquires the status information B-1 (refer to processing P5 illustrated in FIG. 6A). The state indicated by the status information B-1 is the closed state (refer to FIG. 6B). Further, two seconds after the status information B-1 is acquired, the setup program 303 acquires the status information B-2 (refer to processing P6 illustrated in FIG. 6A). The state indicated by the status information B-2 is the closed state (refer to FIG. 6B).

Next, the user opens the cover of the printer to be registered (refer to processing P7 illustrated in FIG. 6A). Thus, the cover state of the printer becomes the open state. The setup program 303 acquires the status information B-3 (refer to processing P9 illustrated in FIG. 6A). At this point, since the cover state of the printer that the user wants to register is the open state, the state indicated by the status information B-3 is also the open state (refer to FIG. 6B).

Two seconds after the status information B-3 is acquired, the setup program 303 acquires the status information B-4 (refer to processing P10 illustrated in FIG. 6A). The state indicated by the status information B-4 is the open state (refer to FIG. 6B). Sequentially, about three seconds after the user has opened the printer cover in processing P7 illustrated in FIG. 6A, the user closes the printer cover (refer to processing P8 illustrated in FIG. 6A). With this operation, the cover state of the printer becomes the closed state.

The setup program 303 acquires the status information B-5 (refer to processing P11 illustrated in FIG. 6A). At this point, since the cover state of the printer that the use wants to register is the closed state, the state indicated by the status information B-5 is also the closed state (refer to FIG. 6B). In other words, since the cover state of the printer changes to the closed state (refer to processing P9 to processing P11 illustrated in FIG. 6A) after the open state has been indicated twice continuously, the above-described printer registration condition is satisfied. Therefore, the setup program 303 specifies this printer as the printer to be registered (refer to processing P12 illustrated in FIG. 6A).

Figure 7:
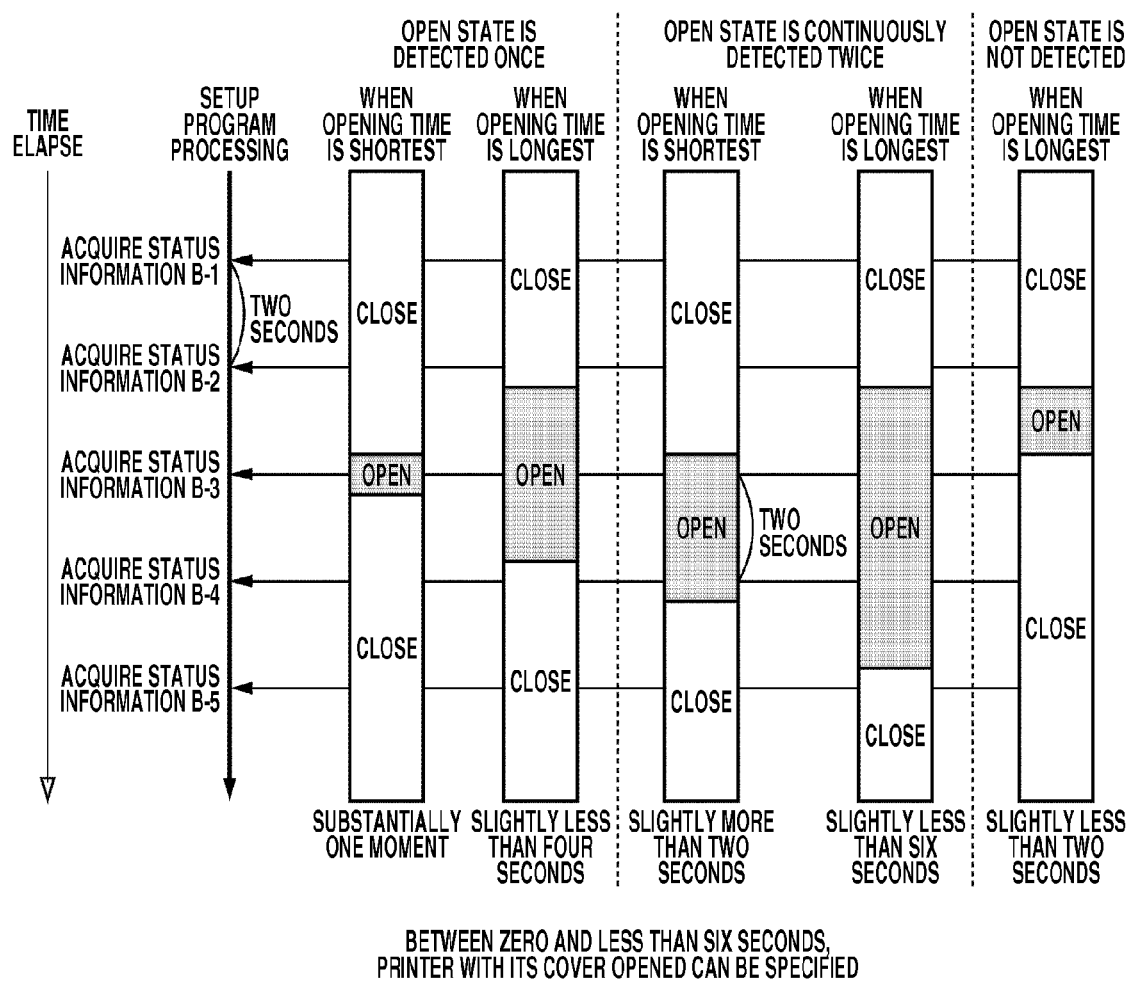
FIG. 7 illustrates times when a cover is in an open state according to an exemplary embodiment of the present invention.

FIG. 7 illustrates time when the cover state becomes the open state according to the second exemplary embodiment. FIG. 7 illustrates the time when the cover state becomes the open state for each of the printer in which the cover state changes to the closed state after the opening state has been detected once, the printer in which the cover state changes to the closed state after the open state has been detected twice continuously, and the printer in which the open state is not detected. The printer in which the open state has been detected once has the shortest time for the open state, when the cover is opened right before the status information B-3 is acquired and closed right after the status information B-3 is acquired. The printer in which the open state has been detected once has the longest time for the open state (slightly less than four seconds), when the cover is opened right after the status information B-2 was acquired and the cover is closed right before the status information B-4 is acquired. The printer in which the open state has been detected twice continuously has the shortest time for the open state (slightly less than two seconds), when the cover is opened right before the status information B-3 is acquired and closed right after the status information B-4 was acquired. The printer in which the open state has been detected twice continuously has the longest time for the open state (slightly less than six seconds), when the cover is opened right after the status information B-2 was acquired and the cover is closed right before the status information B-5 is acquired.

According to the printer registration condition of the second exemplary embodiment, the printer in which the time for the closed state of the cover is zero seconds to less than six seconds can be specified as the registration target. Thus, when the interval for opening and closing the printer cover that is instructed to the user is determined to be, for example, three seconds so that the printer to be registered can be specified considering an error of the interval for opening and closing the cover caused by an individual difference. As illustrated in FIG. 7, even when the cover is in the open state during two seconds that is the interval for acquiring the status information, the open state may not be detected due to a timing of acquiring the status information. According to the present exemplary embodiment, the interval for opening and closing the cover is determined to be three seconds that is longer than slightly less than two seconds, which is the longest time in such a state. Accordingly, it is conceivable that the state in which the open state of the cover is not detected does not occur frequently. According to the present exemplary embodiment, even when the state in which the open state is not detected occurs, the processing from step S2 and subsequent steps illustrated in FIG. 4 is retried and the printer to be registered can be specified.

As illustrated in FIG. 5A, the status information acquired by the setup program 303 includes an ink remaining amount and error states including paper out and paper jam, in addition to the cover state of the printer. Thus, according to the second exemplary embodiment and another exemplary embodiment, the setup program 303 may narrow down candidates of the target printer to be registered based on information other than the cover state of the printer included in the status information. More specifically, the setup program 303 eliminates from the printer to be registered the printer in which a state other than a state to be changed according to the performed operation content notified to the user has been changed.

The setup program 303 performs the processing described below based on information about the error state included in the status information about the printer. More specifically, when it is detected that the printer is released from the error status, the setup program 303 determines that the user who is going to register the printer does not operate the printer but another user operates the printer, and then eliminates this printer from the printer to be registered. When the setup program 303 detects that the ink remaining amount has been changed based on information of the ink remaining amount included in the status information of the printer, the setup program 303 may eliminate the printer from the printer to be registered.

Figure 8:
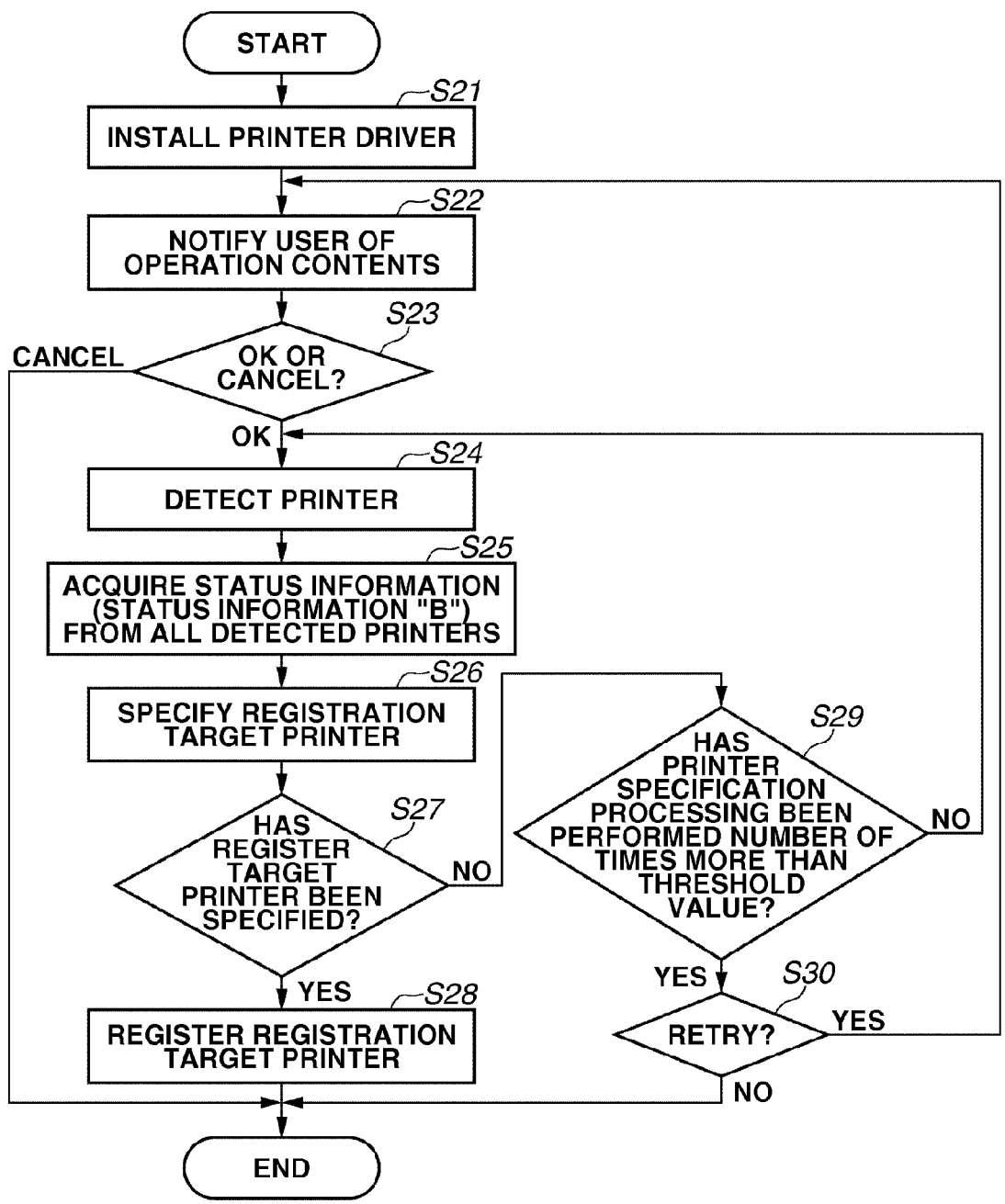
FIG. 8 is a flowchart illustrating operation processing performed by the computer according to an exemplary embodiment of the present invention.

FIG. 8 is a flowchart illustrating operation processing performed by the computer of a third exemplary embodiment. Steps S21, S22, S23, S25, S27, S28, S29, and S30 illustrated in FIG. 8 are similar to steps S1, S4, S5, S6, S8, S9, S10, and S11 in FIG. 4 respectively which are performed in the second exemplary embodiment described above. According to the third exemplary embodiment, when the setup program 303 repeatedly acquires the status information B in step S24, the setup program 303 detects the printer in the network each time. Further, as with the second exemplary embodiment, in step S26, the setup program 303 specifies the printer to be registered based on the transition of the change of the status of the printer indicated by the status information B which is repeatedly acquired in step S25.

More specifically, according to the third exemplary embodiment, after the operation content is notified to the user, the setup program 303 detects the printer in the network 106 and then acquires the status information. Thus, even if the power supply of the printer is off when the operation content is notified to the user, the setup program 303 can acquire the status information after the printer is turned on by user's operation, and then specify the printer to be registered.

Figure 9A:
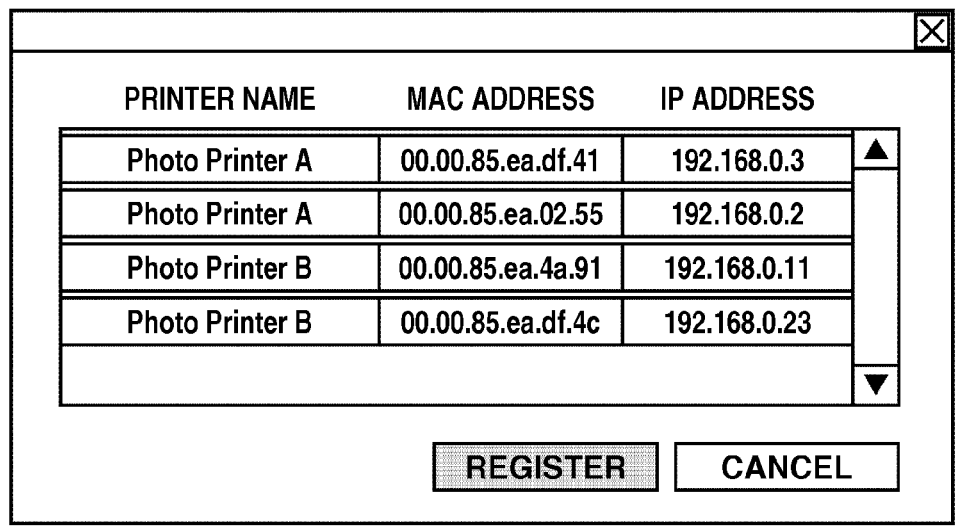
FIGS. 9A and 9B illustrate a fourth exemplary embodiment.
Figure 9B:
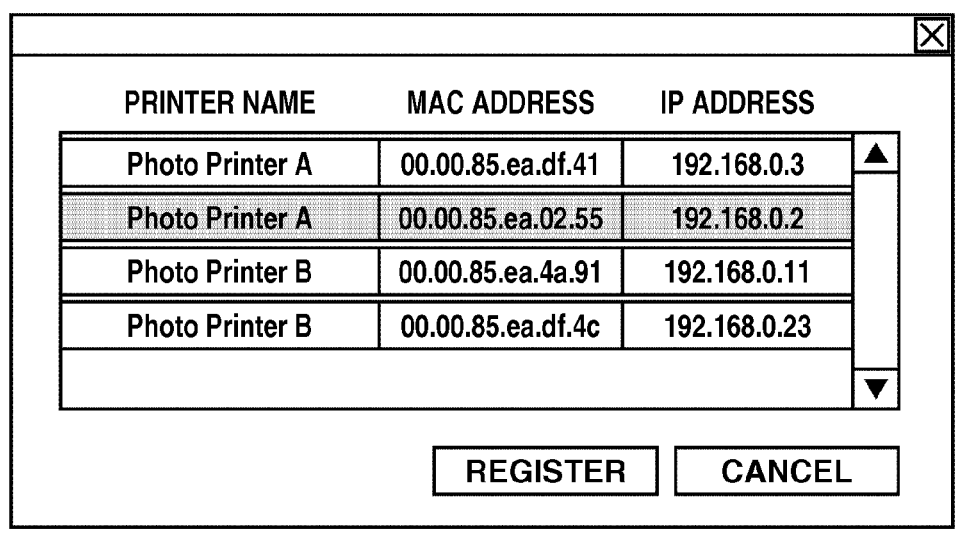

FIGS. 9A and 9B illustrate a fourth exemplary embodiment. According to the fourth exemplary embodiment, the setup program 303 functions as a printing apparatus display unit for displaying the printer specified as the registration target on the monitor 201. The setup program 303 registers the printer selected by the user from the displayed printers described above.

According to the fourth exemplary embodiment, the setup program 303 detects the printer in step S2 illustrated in FIG. 4 or in step S24 illustrated in FIG. 8. Further, as illustrated in FIG. 9A, the setup program 303 displays information indicating the detected printers on the display screen. On the display screen illustrated in FIG. 9A, the printer names, the MAC addresses, and the IP addresses of the detected printers are displayed. A REGISTER button on the screen is used by the user to register the target printer to be registered. A CANCEL button is used by the user to cancel the registration of the target printer to be registered. At this point, since the printer to be registered is not specified, the REGISTER button is set in a state that cannot be pressed, as illustrated with hatching. Only the CANCEL button can be pressed.

When the setup program 303 specifies the printer to be registered, the setup program 303 displays the display screen as illustrated in FIG. 9B. The printer corresponding to the hatched portion in FIG. 9B is the printer that is specified as the registration target. In the example illustrated in the FIG. 9B, the hatching indicates a state where the printer included in the hatched portion is selectable. Further, in the display screen illustrated in FIG. 9B, the REGISTER button is in an active state (can be pressed). The user presses the REGISTER button to select the printer which the user wants to register. The printing system 304 finally registers the selected printer. According to the fourth exemplary embodiment, the user can easily determine whether to finally register the printer to be registered.

The present invention can be realized by executing the following processing. More specifically, software (program) for realizing the functions of the above-described exemplary embodiments is supplied to a system or an apparatus via a network or various types of storage media, so that a computer, a CPU, a micro processing unit (MPU), and/or the like, of the system or the apparatus can read and execute the program. In this case, the program and the storage medium storing the program constitute the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-260974 filed Nov. 16, 2009, which is hereby incorporated by reference herein in its entirety.

What is claimed is:

1. An information processing apparatus comprising:
a detection unit configured to detect a plurality of printing apparatuses;
a display unit configured to display a message notifying a user to manipulate a cover of a printing apparatus so as to be changed into a second cover state from a first cover state before the printing apparatus is registered to the information processing apparatus;
a first acquisition unit configured to acquire a cover state before the display unit displays the message from each of the plurality of printing apparatuses detected by the detection unit;
a second acquisition unit configured to acquire a cover state after the display unit has displayed the message from each of the plurality of printing apparatuses detected by the detection unit; and
a specification unit configured to specify a printing apparatus for which the first acquisition unit has acquired the first cover state and the second acquisition unit has acquired the second cover state from among the plurality of printing apparatuses detected by the detection unit, each cover state being either an open state or a closed state.

2. The information processing apparatus according to claim 1,
wherein the display unit displays a message notifying a user to manipulate the cover of the printing apparatus once and to manipulate the cover of the printing apparatus again after a predetermined period of time, and
wherein the specification unit specifies the printing apparatus from among the plurality of printing apparatus detected by the detection unit based on change of a cover state from a cover state acquired by the first acquisition unit to a cover sate acquired by the second acquisition unit.

3. The information processing apparatus according to claim 1, further comprising a registration unit configured to register the printing apparatus specified by the specification unit.

4. The information processing apparatus according to claim 3,
wherein the display unit further displays the printing apparatus specified by the specification unit, and
wherein the registration unit registers a selected printing apparatus among the printing apparatuses which are displayed by the display unit.

5. The information processing apparatus according to claim 1, wherein the specification unit eliminates from the printing apparatus to be registered a printing apparatus in which a cover state other than the cover state to be changed according to the message displayed by the display unit has been changed.

6. An information processing method comprising:
detecting a plurality of printing apparatuses;
displaying a message notifying a user to manipulate a cover of a printing apparatus so as to be changed into a second cover state from a first cover state before the printing apparatus is registered;
acquiring a cover state before the message is displayed from each of the plurality of the detected printing apparatuses;

acquiring a cover state after the message has been displayed from each of the plurality of detected printing apparatuses; and specifying a printing apparatus for which the first cover state has been acquired and the second cover state has been acquired from among the detected plurality of printing apparatuses, each cover state being either an open state or a closed state.

7. The information processing method according to claim 6, further comprising:

displaying a message notifying a user to manipulate the cover of the printing apparatus once and to manipulate the cover of the printing apparatus again after a predetermined period of time; and specifying the printing apparatus from among the plurality of detected printing apparatuses based on change of a cover state from the acquired first cover state to the second cover state.

8. The information processing apparatus according to claim 6, further comprising registering the specified printing apparatus.

9. The information processing apparatus according to claim 8, further comprising:

displaying the specified printing apparatus; and registering a selected printing apparatus among the displayed printing apparatuses.

10. The information processing apparatus according to claim 9, further comprising eliminating from the printing apparatus to be registered a printing apparatus in which a cover state other than the cover state to be changed according to the displayed message has been changed.

11. A non-transitory storage medium storing a program that causes a computer to perform a method comprising:

detecting a plurality of printing apparatuses;

displaying a message notifying a user to manipulate a cover of a printing apparatus so as to be changed into a second cover state from a first cover state before the printing apparatus is registered;

acquiring a cover state before the message is displayed from each of the plurality of the detected printing apparatuses;

acquiring a cover state after the message has been displayed from each of the plurality of detected printing apparatuses; and specifying a printing apparatus for which the first cover state has been acquired and the second cover state has been acquired from among the detected plurality of printing apparatuses, each cover state being either an open state or a closed state.

* * * * *